(12) United States Patent
Baker et al.

(10) Patent No.: US 8,683,549 B2
(45) Date of Patent: Mar. 25, 2014

(54) SECURE DATA STORAGE AND RETRIEVAL INCORPORATING HUMAN PARTICIPATION

(75) Inventors: Arthur H. Baker, Redmond, WA (US); Brian J. Guarraci, Redmond, WA (US); Andrew Stewart Tucker, Seattle, WA (US); Gennady Medvinsky, Redmond, WA (US); Tanmoy Dutta, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1807 days.

(21) Appl. No.: 11/690,685

(22) Filed: Mar. 23, 2007

(65) Prior Publication Data

US 2008/0320554 A1 Dec. 25, 2008

(51) Int. Cl.
 *H04L 29/06* (2006.01)
(52) U.S. Cl.
 USPC .............................................. 726/2; 713/193
(58) Field of Classification Search
 USPC .............................................. 726/2; 713/193
 See application file for complete search history.

(56) References Cited

U.S. PATENT DOCUMENTS

| | | | |
|---|---|---|---|
| 5,679,075 A * | 10/1997 | Forrest et al. | 463/9 |
| 5,841,870 A | 11/1998 | Fieres et al. | 380/25 |
| 5,921,548 A * | 7/1999 | Goldberg | 273/157 R |
| 6,027,117 A * | 2/2000 | Goldberg | 273/157 R |
| 6,209,102 B1 | 3/2001 | Hoover | 713/200 |
| 6,790,138 B1 * | 9/2004 | Erlichman | 463/9 |
| 6,944,765 B1 * | 9/2005 | Rose et al. | 713/181 |
| 7,200,576 B2 * | 4/2007 | Steeves et al. | 705/64 |
| 7,234,157 B2 * | 6/2007 | Childs et al. | 726/2 |
| 7,505,946 B2 * | 3/2009 | Chellapilla et al. | 706/11 |
| 7,565,330 B2 * | 7/2009 | Steeves et al. | 705/75 |
| 7,653,944 B2 * | 1/2010 | Chellapilla et al. | 726/27 |
| 7,688,975 B2 * | 3/2010 | Lin et al. | 380/44 |
| 7,721,107 B2 * | 5/2010 | Golle et al. | 713/184 |
| 7,770,209 B2 * | 8/2010 | Billingsley et al. | 726/2 |
| 8,302,967 B2 * | 11/2012 | Kim et al. | 273/153 S |
| 8,339,360 B2 * | 12/2012 | DeLuca et al. | 345/156 |
| 8,352,598 B2 * | 1/2013 | Nyang et al. | 709/225 |
| 2003/0220882 A1 * | 11/2003 | Rabin et al. | 705/57 |
| 2004/0236953 A1 | 11/2004 | Mereene et al. | 713/182 |
| 2005/0033963 A1 * | 2/2005 | Ronchi et al. | 713/170 |
| 2005/0065802 A1 * | 3/2005 | Rui et al. | 705/1 |

(Continued)

FOREIGN PATENT DOCUMENTS

CN 1249584 A 4/2000

OTHER PUBLICATIONS

Xu et al., Mandatory human participation: a new authentication scheme for building secure systems, 2003, IEEE.*

(Continued)

*Primary Examiner* — David Garcia Cervetti
(74) *Attorney, Agent, or Firm* — Woodcock Washburn, LLC (57) ABSTRACT

A computer related security mechanism requires that a human participate in an access verification sequence. Upon a request to access secure data, a puzzle is provided to the requester. Proper solution of the puzzle requires human participation. The puzzle is chosen such that its solution is within the capabilities of a human, but beyond the current state of the art for computer systems. The puzzled can be visually and/or audibly rendered to the user. In one configuration, the puzzle is obtained via a library of pluggable puzzle generators. Puzzle generators in the library can be replaced as the state of the art of computing technology improves.

15 Claims, 5 Drawing Sheets

(56) References Cited

U.S. PATENT DOCUMENTS

| | | | |
|---|---|---|---|
| 2005/0193208 A1* | 9/2005 | Charrette et al. | 713/182 |
| 2005/0229251 A1 | 10/2005 | Chellapilla et al. | 726/23 |
| 2006/0026246 A1 | 2/2006 | Fukuhara et al. | 709/206 |
| 2006/0050870 A1* | 3/2006 | Kimmel et al. | 380/30 |
| 2006/0112280 A1* | 5/2006 | Cohen et al. | 713/186 |
| 2006/0133617 A1* | 6/2006 | Minamizawa | 380/286 |
| 2006/0218400 A1* | 9/2006 | Kimmel et al. | 713/168 |
| 2006/0242407 A1* | 10/2006 | Kimmel et al. | 713/166 |
| 2006/0287963 A1* | 12/2006 | Steeves et al. | 705/64 |
| 2007/0005500 A1* | 1/2007 | Steeves et al. | 705/51 |
| 2007/0142106 A1* | 6/2007 | Proch et al. | 463/9 |
| 2007/0156592 A1* | 7/2007 | Henderson | 705/51 |
| 2007/0168678 A1* | 7/2007 | Meenakshisundaram | 713/189 |
| 2007/0192849 A1* | 8/2007 | Golle et al. | 726/16 |
| 2007/0250920 A1* | 10/2007 | Lindsay | 726/7 |
| 2008/0049939 A1* | 2/2008 | Canetti et al. | 380/277 |
| 2008/0063276 A1* | 3/2008 | Vincent et al. | 382/182 |
| 2008/0063277 A1* | 3/2008 | Vincent et al. | 382/182 |
| 2008/0063278 A1* | 3/2008 | Vincent et al. | 382/182 |
| 2008/0063279 A1* | 3/2008 | Vincent et al. | 382/182 |
| 2009/0259588 A1* | 10/2009 | Lindsay | 705/40 |

OTHER PUBLICATIONS

Aura, T. et al., "DOS-resistant Authentication with Client Puzzles," Apr. 3-5, 2000 http://tcs.hut.fi/old/papers/aura/aura-nikander-leiwo-protocols00.pdf, 8 pages.

Daily, M. et al., "A Text-Graphics Character CAPTCHA for Password Authentication," http://www.siit.tu.ac.th/mdailey/papers, 4 pages, Nov. 2004.

Hall, Jr., Richard V., "CAPTCHA as a Web Security Control," Aug. 24, 2005, http://www.richhall.com/captcha/captcha_20051217.doc, 16 pages.

Xu, J. et al., "Mandatory Human Participation: A New Authentication Scheme for Building Secure Systems", http://www-static.cc-gatech.edu/~mhsung/mhp_ic3n.pdf, 6 pages, 2003.

Hai-kun et al., "Research on security model with Chinese CAPTCHA", Computer Engineering and Design, Mar. 31, 2006, 27(6), 985-987.

* cited by examiner

SECURE DATA STORAGE AND RETRIEVAL INCORPORATING HUMAN PARTICIPATION

TECHNICAL FIELD

The technical field relates generally to computer processing and more specifically to computer security.

BACKGROUND

Typical access-control mechanisms do not distinguish between input provided by people and input provided by software. As a result, rogue software running on a system can mimic the behavior of a human user and gain unauthorized access to protected resources. For example, a keystroke logger can capture a user's account name and password and later replay them as part of an access-verification sequence. Similarly, typical access-control mechanisms are susceptible to brute force attacks such as a dictionary attack or a "man in the middle" attack. Brute force attacks can be particularly detrimental to password protected storage of encrypted data.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

A verification mechanism requires that a human being participate in an access verification sequence. To access data, a puzzle is provided. Proper solution of the puzzle requires human intervention. The puzzle is chosen such that its solution is within the capabilities of a human, but beyond the current state of the art for computer systems. In an example embodiment, the verification mechanism is utilized to ensure that data encrypted under a user password requires an actual human agent to participate in every attempt to access to the underlying cleartext data.

BRIEF DESCRIPTION OF THE DRAWINGS

The foregoing summary, as well as the following detailed description, is better understood when read in conjunction with the appended drawings. For the purpose of illustrating the secure data storage and retrieval incorporating human participation, there is shown in the drawings exemplary constructions thereof, however, providing functionality via the secure data storage and retrieval incorporating human participation is not limited to the specific methods and instrumentalities disclosed.

DETAILED DESCRIPTION OF ILLUSTRATIVE EMBODIMENTS

Figure 1:
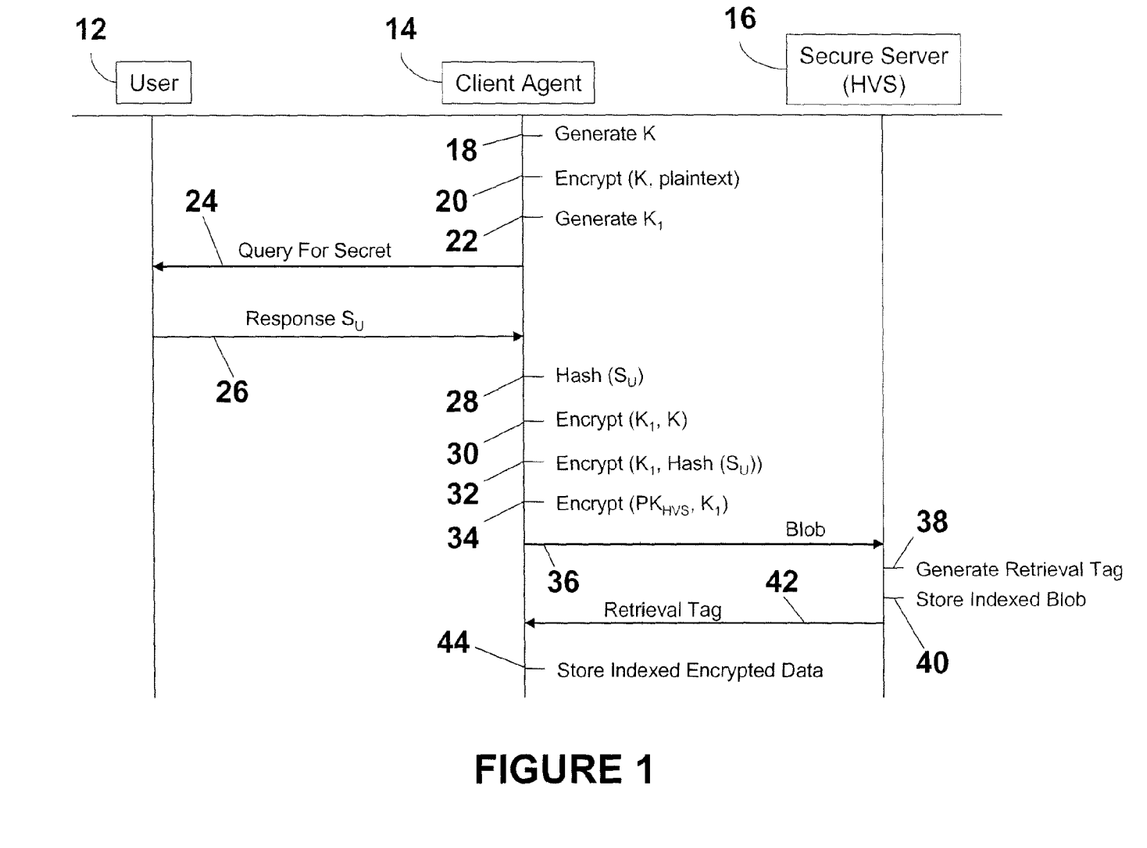
FIG. 1 is a flow diagram of an example sequence of events for securely storing data.
Figure 2:
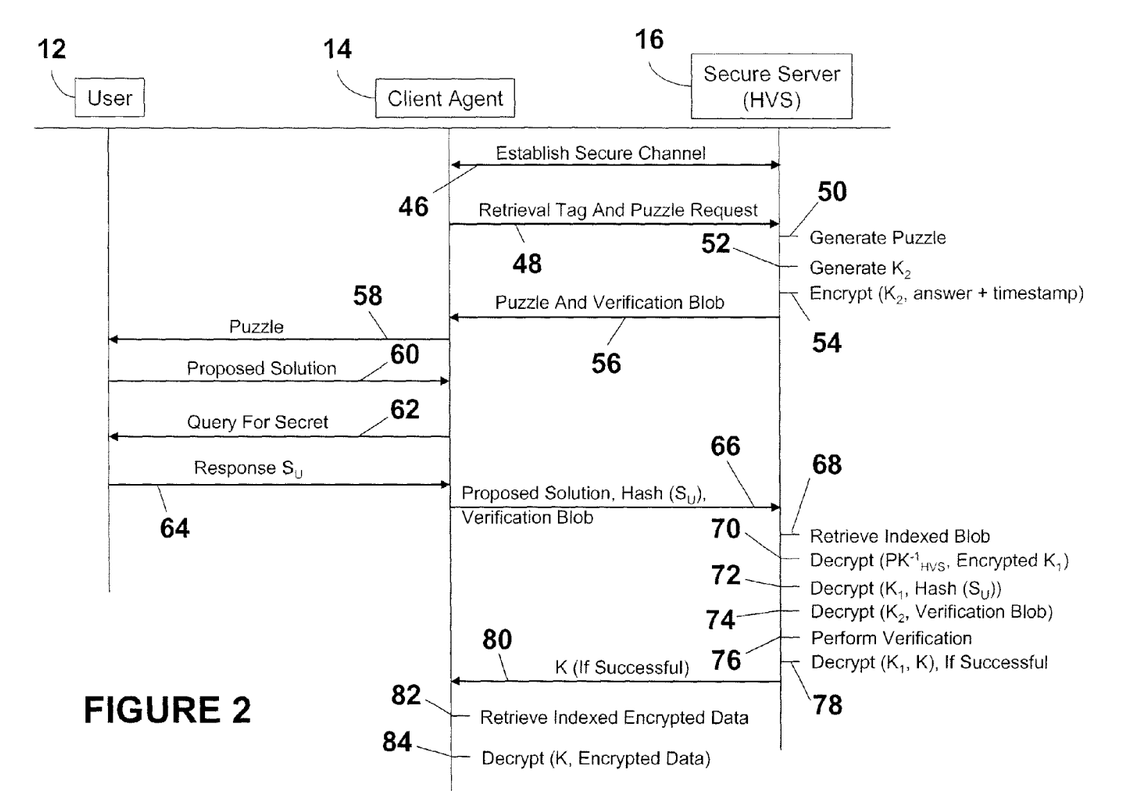
FIG. 2 is a flow diagram of an example sequence of events for securely retrieving data.

FIG. 1 and FIG. 2 depict a sequential flow diagram of an example sequence of events for implementing a secure data storage and retrieval incorporating human participation. FIG. 1 depicts an example sequence of events for storing secure data and FIG. 2 depicts an example sequence of events for retrieving secure data. A cryptographic protocol for secure storage and retrieval of data requires authorization from a human being in order to perform data retrieval operations. In an example configuration, two agents are utilized to implement the protocol. As depicted in FIG. 1, the first agent 14, a client, manages interactions with a human user 12. The second agent 16, a secure server (referred to as the human verification service or HVS), coordinates cryptographic operations and acts as a repository for protected data. The client agent 14 and the HVS server 16 are depicted separately, for the sake of clarity. It is to be understood however, that the client agent 14 and the HVS server 16 can comprise separate processors, the same processor, or a combination thereof. For example, the client agent 14 and HVS server 16 could be running in separate processes on a single computer system, running on separate hosts in a multi-computer network, or a combination thereof.

As mentioned above, FIG. 1 is a flow diagram of an example sequence of events for storing secure data. At step 18, the client agent 14 generates a cryptographic key, K. The cryptographic key can comprise any appropriate random cryptographic key. In an example embodiment, the cryptographic key, K, is a symmetric key (e.g., a symmetric key in accordance with the Advanced Encryption Standard, AES). At step 20, the plain text of the data to be stored is encrypted with the cryptographic key, K, to generate encrypted data. Another cryptographic key, $K_1$, is generated by the client agent 14 at step 22. The cryptographic key, $K_1$, can comprise any appropriate cryptographic key, such as a symmetric cryptographic key, for example. It is to be understood that the sequence of events as depicted in the Figures is exemplary and thus not limited thereto. The sequence of events can be modified as appropriate. For example, step 22 could be performed before step 18 or step 20.

The client agent 14 queries the user, at step 24, for a secret, such as a PIN, a password, or the like. The user responds to the query with the user's secret, $S_U$, at step 26. The client agent 14 operates on the user's secret, $S_U$, with a cryptographic hash function, at step 28. Hash functions are known in the art. A hash function is a function that transforms a variable-size input into a fixed size value. Typically, hash functions are one way, meaning that it is impracticable or impossible to determine the input value from the output (transformed) value. Providing the same input to a hash function will provide the same output. A slight change in the input typically results in a considerable change in the output. Example hash functions include MD2, MD5, SHA-1, SHA-224, SHA-256, SHA-384, and SHA-512.

At step 30, the cryptographic key, K, is encrypted with the cryptographic key, $K_1$. At step 32, the Hash value indicative of the user's secret, Hash ($S_U$), is encrypted with the cryptographic key, $K_1$. In an example embodiment, the user's secret, $S_U$, is not stored in the client agent 14 after the hash function is performed. This can provide added security because the user's secret, $S_U$, is less susceptible to theft. At step 34, the cryptographic key, $K_1$, is encrypted with the public key, of a public/private cryptographic key pair of the secure server 16. Public key cryptography, which utilizes a public/private key pair, is known in the art. One key is used to encrypt and the other is used to decrypt. Knowledge of one key does not provide knowledge of the other key. Typically one key is kept secret, and thus called the private key. The other key typically is made public. An example of public key cryptography is RSA public key cryptography. The information encrypted at steps 30, 32, and 33, referred to as a blob in FIG. 1, is provided to the secure server 16, at step 36. That is, at step 36, the client agent 14 provides to the secure server 16, the cryptographic key, K, encrypted with the cryptographic key, $K_1$, the hash value indicative of the user's secret, Hash ($S_U$), encrypted with the cryptographic key, $K_1$, and the cryptographic key, $K_1$, encrypted with the public key, of the secure server's 16 public/private cryptographic key pair.

At step 38, the secure server 16 generates a unique tag value, referred to as a retrieval tag in FIG. 1, to identify the blob received at step 36. The blob is stored in a database, memory, or the like of the secure server at step 40. The blob is indexed by the retrieval tag. Thus, the blob can be retrieved from the database, memory, or the like, via the retrieval tag. At step 42, the secure server 16 provides the retrieval tag to the client agent 14. At step 44, the client agent 14 stores the encrypted data generated at step 20 using the retrieval tag as an index. That is, the client agent 14 stores in a database, memory, or the like the plain text encrypted with the cryptographic key, K, and the stored encrypted data is indexed utilizing the retrieval tag such that the retrieval tag can be used to retrieve the encrypted data from storage.

FIG. 2 is a flow diagram of an example sequence of events for securely retrieving data. To retrieve the original plain text, the client agent 14 utilizes the retrieval tag that was generated (at step 38) during the storage process to access the secure server 16. A secure channel is established, at step 46, between the client agent 14 and the secure server 16. The secure channel can be established in accordance with any appropriate means. At step 48, the client agent 14 sends the retrieval tag and a request for a puzzle to the secure server 16.

A puzzle and the correct solution to the puzzle are generated at step 50. The puzzle can comprise any appropriate type of puzzle requiring human intervention to obtain a solution. In various embodiments, the puzzle can require a user to respond to a visual rendering, an audio rendering, or a combination thereof. For example, the puzzle could require a user to enter letters observed in a distorted image (e.g., a completely automated public Turing test, CAPTCHA). The puzzle could require a user to answer a question observed in a distorted image. The puzzle could require a user to enter letters heard in distorted audio. The puzzle could require a user to answer a question heard in distorted audio. In various embodiments, the user's response can be provided via a keyboard, a mouse, orally, or a combination thereof. The puzzle is chosen such that its solution is within the capabilities of a human, but beyond the current state of the art for computer systems. The puzzle can be generated by the secure server 16, by another processor, or a combination thereof. In an example embodiment, the puzzle is obtained via a library of pluggable puzzle generators. This embodiment allows puzzles to be replaced as the state of the art of computing technology makes some puzzles more susceptible to mechanical solution. In various embodiments, the puzzle can be generated by the secure server 16 each time a request is provided thereto, the puzzle can be a predetermined puzzle, a puzzle type (e.g., puzzle category) can be predetermined, or a combination thereof. If the puzzle is a predetermined puzzle or the puzzle type is predetermined, an indication of a puzzle or puzzle type could be provided at step 48.

At step 52, the secure server 16 generates a random cryptographic key, $K_2$. The cryptographic key, $K_2$, can comprise any appropriate cryptographic key, such as a symmetric cryptographic key, for example. At step 54, the correct solution to the puzzle is encrypted with the cryptographic key, $K_2$. In an example embodiment, a timestamp is included with the correct solution and encrypted with the cryptographic key, $K_2$. The encrypted correct solution and optional timestamp, referred to as a verification blob, and the puzzle, are provided by the secure server 16 to the client agent 14, at step 56. The puzzle is provided by the client agent 14 to the user 12 at step 58. The user 12 solves the puzzle incorporating human participation and provides a proposed solution to the client agent 14, at step 60. The user 12 is queried for the user's secret at step 62. The user 12 responds to the query (step 62) with the user's secret, $S_U$, at step 64. At step 66, the client agent 14, sends to the secure server 16, the proposed solution (received at step 60), the hash value indicative of the user's secret (Hash ($S_U$)), and the verification blob (the encrypted correct solution and optional timestamp generated at step 54).

The secure server 16, at step 68, retrieves the indexed client blob utilizing the retrieval tag. That is, the secure server 16 retrieves, using the retrieval tag generated at step 38, the cryptographic key, K, encrypted with the cryptographic key, $K_1$, the hash value indicative of the user's secret, Hash ($S_U$), encrypted with the cryptographic key, $K_1$, and the cryptographic key, $K_1$, encrypted with the public key, of the secure server's 16 public/private cryptographic key pair, stored at step 40. At step 70, the cryptographic key, $K_1$, that was encrypted (at step 34) with the public key, $PK_{HVS}$, is decrypted with the private key, $PK^{-1}_{HVS}$, of the secure server's 16 public/private cryptographic key pair. At step 72, the hash value indicative of the user's secret (Hash ($S_U$), that was encrypted (at step 32) is decrypted with cryptographic key, $K_1$. At step 74, the verification blob (correct solution and optional timestamp generated) that was encrypted (at step 54) is decrypted with the cryptographic key, $K_2$.

Verification is performed at step 76. If verification is successful, access to the stored data (plain text) is allowed to. If verification is unsuccessful, access to the data (plain text) in not allowed. In an example embodiment, verification fails if the hash value indicative of the user's secret provided at step 64 differs from the hash value indicative of the user's secret provided at step 26. That is, verification fails if the user's secret provided when the client agent 14 first queries the user 12 differs from the user's secret provided with the user's proposed solution to the puzzle. In an example embodiment, the user 12 is given a limited period of time to provide a proposed response to the puzzle. Accordingly, the verification fails if the current time, i.e., the time at which the secure server 16 is performing verification, differs from the time indicated by the time stamp in the verification blob (generated at step 54) by greater than a predetermined amount of time. For example, if the current time differs from the time indicated by the time stamp by more than 30 seconds, verification will fail. Verification fails if the proposed solution to the puzzle provided by the user 12 (at step 60) differs from the correct solution.

Figure 3:
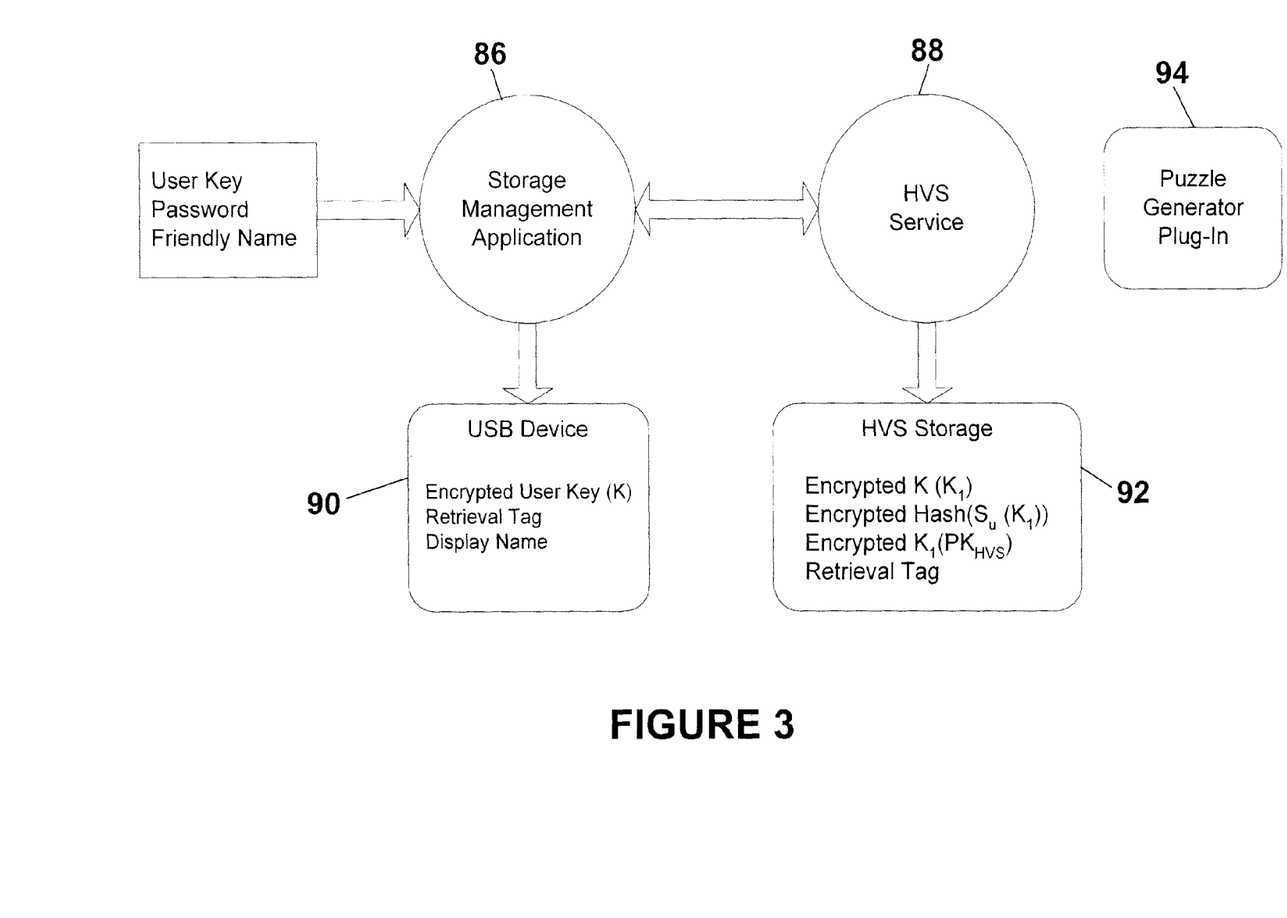
FIG. 3 illustrates an example implementation of the storage sequence of the secure data storage and retrieval incorporating human participation.
Figure 4:
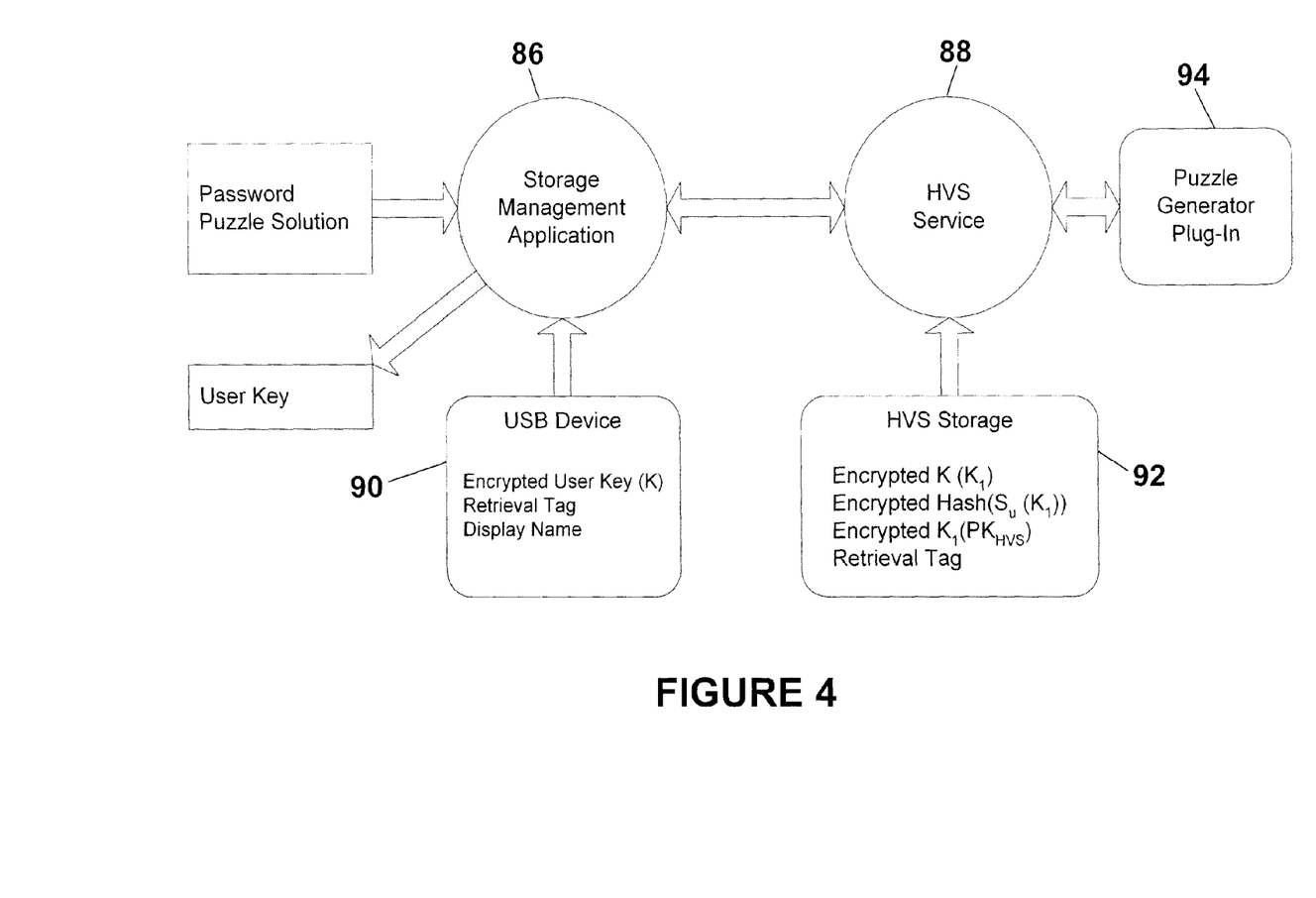
FIG. 4 illustrates an example implementation of the retrieval sequence of the secure data storage and retrieval incorporating human participation.

FIG. 3 and FIG. 4 illustrate an example implementation of the secure data storage and retrieval incorporating human participation utilizing a passive Universal Serial Bus (USB) device 90 as storage for the storage management application 86. FIG. 3 illustrates an example implementation of the storage sequence of the secure data storage and retrieval incorporating human participation. The implementation comprises a storage management application 86 (e.g., the client agent), a human verification service (HVS) 88 (e.g., the secure HVS server), the storage medium 90, and storage medium 92. The storage medium 90 can comprise any appropriate storage medium, such as a disk, semiconductor memory, a database, or the like, for example. As depicted in FIG. 3, in an example embodiment, the storage medium 90 comprises a USB storage device (e.g., a key drive). The storage device 90 requires no special cryptographic capabilities. The storage medium 92 can comprise any appropriate storage medium, such as a disk, semiconductor memory, a database, or the like, for example.

To accomplish storage of secure data, the storage-management application 86 accepts a user data-key to be stored, a password, and a friendly display name from the user. A user data key can comprise any appropriate secret that guards sensitive user data. For example, a data key can comprise a password, an encryption, of the like. The display name functions as a reminder to the user of the identity of the user data-key. the display name is not be encrypted. After executing the storage sequence of the secure data storage and retrieval incorporating human participation as described above, the storage-management application 86 possesses a retrieval tag and a copy of the user-data key that has been encrypted with the cryptographic key, K. The storage management application 86 stores both the retrieval tag and the copy of the user-data key along with the data key's friendly display name on the USB device 90.

After executing the of the storage sequence, as described above, of the storage and retrieval incorporating human participation, the HVS 88 possesses a copy of the cryptographic key, K, and the hash value indicative of the user's secret, $S_U$, both of which are encrypted using the cryptographic key $K_1$. The HVS 88 also possesses an encrypted copy of $K_1$ that the HVS 88 can recover by using the HVS's 88 private key. These items are stored as a group and indexed with the retrieval tag value. Taken together, this data will allow the HVS 88 to recreate the value of K and the hash value indicative of the user's secret.

FIG. 4 illustrates an example implementation of the retrieval sequence of the secure data storage and retrieval incorporating human participation. When the user wants to recover the data key, the user executes the storage management application 86 again. The storage-management application 86 presents a list of friendly display names loaded from the USB device 90 to the user. The user can select one of the display names to recover the associated data key(s). During the retrieval sequence of the secure data storage and retrieval incorporating human participation, the storage management application 86 prompts the user for a password or the like and provides to the user a puzzle requiring human participation to obtain a solution. Upon receiving the user's response (e.g., the user's proposed solution to the puzzle), the storage management application 86, sends the user's response to the HVS 88. The HVS 88 evaluates the password and user's proposed puzzle solution. If the HVS determines that the password is correct and the user's proposed puzzle solution is correct, the HVS 88 returns the original key, K, to the storage management application 88. The storage management application 86 uses cryptographic key, K, to decrypt the original user data key from the USB storage device 90. At no point during the storage sequence or the retrieval sequence, does the HVS 88 have access to the plaintext version of the user's data key.

Figure 5:
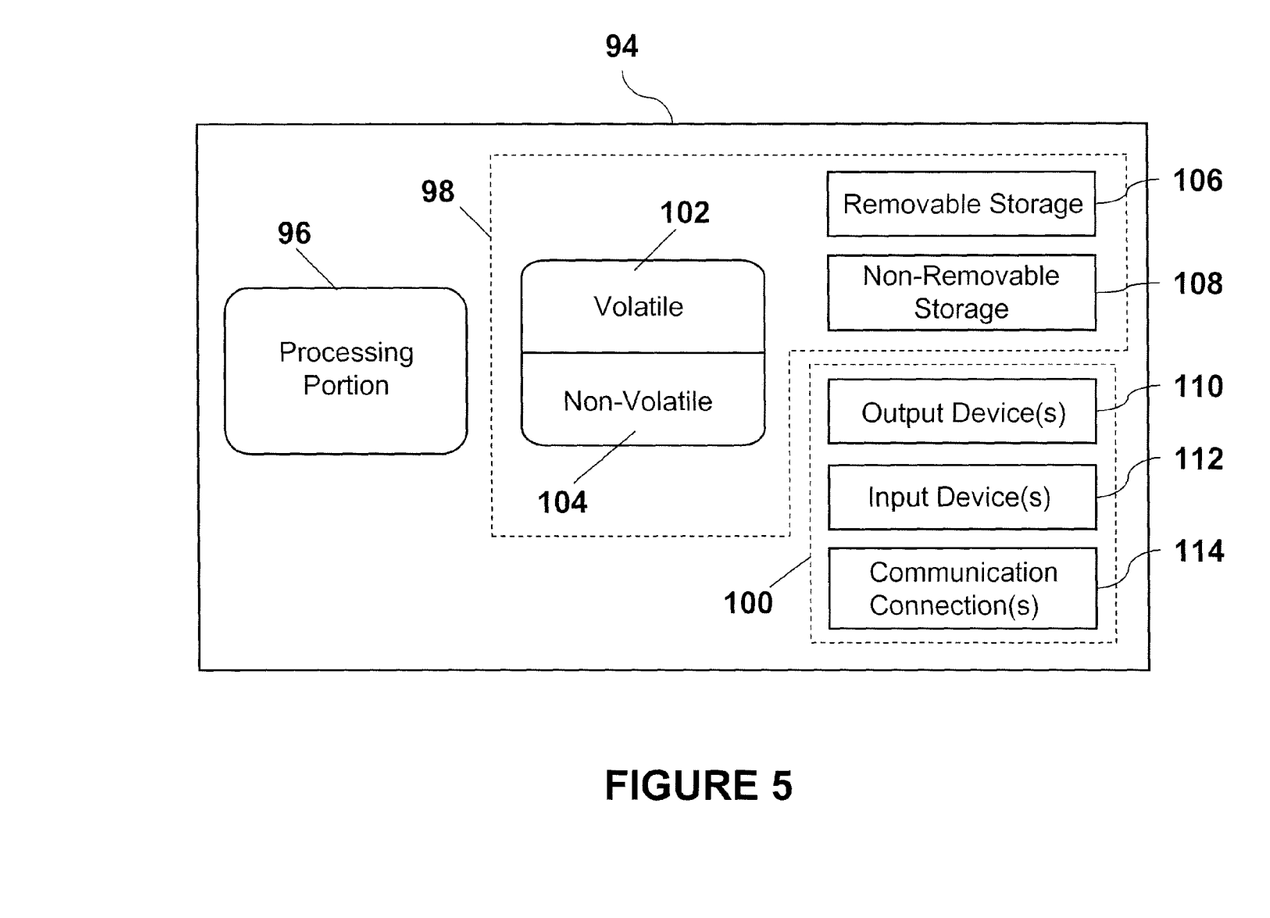
FIG. 5 is a diagram of an exemplary processor for implementing the secure data storage and retrieval incorporating human participation.

FIG. 5 is a diagram of an exemplary processor 94 for implementing the secure data storage and retrieval incorporating human participation. The processor 94 comprises a processing portion 96, a memory portion 98, and an input/output portion 100. The processing portion 96, memory portion 98, and input/output portion 100 are coupled together (coupling not shown in FIG. 5) to allow communications therebetween. The input/output portion 100 is capable of providing and/or receiving components utilized to implement the secure data storage and retrieval incorporating human participation as described above. For example, the input/output portion 100 is cable of receiving and/or providing, a query for a user's secret, a user's secret, encrypted information, a cryptographic key, indexed information, a hash value, a retrieval tag, a puzzle, a proposed puzzle solution, or a combination thereof.

The processing portion 96 is capable of implementing the secure data storage and retrieval incorporating human participation as described above. For example, the processing portion 96 is capable of generating a cryptographic key, performing encryption, performing a hash function, generating a retrieval tag, storing an indexed information, establishing a secure channel, generating a puzzle requiring human participation to obtain a solution, retrieving indexed information, performing decryption, performing verification, determining if the current time differs from the time indicated by the time stamp by at least a predetermined amount of time, determining if a first user's secret differs from a second user's secret, determining if the proposed puzzle solution is correct, or a combination thereof.

The processor 94 can be implemented as a client processor and/or a server processor. In a basic configuration, the processor 94 can include at least one processing portion 96 and memory portion 98. The memory portion 98 can store any information utilized in conjunction with implementing the secure data storage and retrieval incorporating human participation. For example, the memory portion 98 can store a cryptographic key, a user's secret, a puzzle, a puzzle solution, a hash value, indexed information, a retrieval tag, or a combination thereof. Depending upon the exact configuration and type of processor, the memory portion 98 can be volatile (such as RAM) 102, non-volatile (such as ROM, flash memory, etc.) 104, or a combination thereof. The processor 94 can have additional features/functionality. For example, the processor 94 can include additional storage (removable storage 106 and/or non-removable storage 108) including, but not limited to, magnetic or optical disks, tape, flash, smart cards or a combination thereof. Computer storage media, such as memory portion 98, 102, 104, 106, and 108, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 94. Any such computer storage media can be part of the processor 94.

The processor 94 can also contain communications connection(s) 114 that allow the processor 94 to communicate with other devices, for example. Communications connection(s) 114 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 94 also can have input device(s) 112 such as keyboard, mouse, pen, voice input device, touch input device, etc. Output device(s) 110 such as a display, speakers, printer, etc. also can be included.

The following discussion provides a brief general description of an example suitable computing environment in which the secure data storage and retrieval incorporating human participation can be implemented. Although not required, various aspects of the secure data storage and retrieval incorporating human participation can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of the secure data storage and retrieval incorporating human participation can be practiced with other computer system configurations, including hand held devices, multi processor systems, microprocessor based or programmable consumer electronics, network PCs, minicomputers, mainframe computers, and the like. Further, the provision of functionality via the secure data storage and retrieval incorporating human participation also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU), the memory (both ROM and RAM), the basic input/output system (BIOS), and various input/output (I/O) devices such as a keyboard, a mouse, a monitor, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with the secure data storage and retrieval incorporating human participation as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

An exemplary general purpose computing system includes a conventional computing device or the like, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing basic routines that help to transfer information between elements within the computing device, such as during start up, is stored in ROM. The computing device may further include a hard disk drive for reading from and writing to a hard disk (hard disk not shown), a magnetic disk drive (e.g., floppy drive) for reading from or writing to a removable magnetic disk (e.g., floppy disk, removal storage), and an optical disk drive for reading from or writing to a removable optical disk such as a CD ROM or other optical media. The hard disk drive, magnetic disk drive, and optical disk drive are connected to the system bus by a hard disk drive interface, a magnetic disk drive interface, and an optical drive interface, respectively. The drives and their associated computer readable media provide non volatile storage of computer readable instructions, data structures, program modules and other data for the computing device. Although the exemplary environment described herein employs a hard disk, a removable magnetic disk, and a removable optical disk, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk, optical disk, ROM, or RAM, including an operating system, one or more application programs, other program modules, and program data. A user may enter commands and information into the computing device through input devices such as a keyboard and pointing device (e.g., mouse). Other input devices (not shown) may include a microphone, joystick, game pad, satellite disk, scanner, or the like. These and other input devices are often connected to the processing unit through a serial port interface that is coupled to the system bus, but may be connected by other interfaces, such as a parallel port, game port, or universal serial bus (USB). A monitor or other type of display device is also connected to the system bus via an interface, such as a video adapter. In addition to the monitor, computing devices typically include other peripheral output devices (not shown), such as speakers and printers. The exemplary environment also includes a host adapter, Small Computer System Interface (SCSI) bus, and an external storage device connected to the SCSI bus.

The computing device may operate in a networked environment using logical connections to one or more remote computers, such as a remote computer. The remote computer may be another computing device (e.g., personal computer), a server, a router, a network PC, a peer device, or other common network node, and typically includes many or all of the elements described above relative to the computing device. The logical connections include a local area network (LAN) and a wide area network (WAN). Such networking environments are commonplace in offices, enterprise wide computer networks, intranets and the Internet.

When used in a LAN networking environment, the computing device is connected to the LAN through a network interface or adapter. When used in a WAN networking environment, the computing device can include a modem or other means for establishing communications over the wide area network, such as the Internet. The modem, which may be internal or external, is connected to the system bus via the serial port interface. In a networked environment, program modules depicted relative to the computing device, or portions thereof, may be stored in the remote memory storage device. It will be appreciated that the network connections shown are exemplary and other means of establishing a communications link between the computers may be used.

While it is envisioned that numerous embodiments of the secure data storage and retrieval incorporating human participation are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for implementing the provision of functionality the secure data storage and retrieval incorporating human participation, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for providing functionality via the secure data storage and retrieval incorporating human participation.

The program(s) can be implemented in assembly or machine language, if desired. In any case, the language can be a compiled or interpreted language, and combined with hardware implementations. The methods and apparatuses for implementing the secure data storage and retrieval incorporating human participation also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of the secure data storage and retrieval incorporating human participation. Additionally, any storage techniques used in connection with the secure data storage and retrieval incorporating human participation can invariably be a combination of hardware and software.

While secure data storage and retrieval incorporating human participation has been described in connection with the example embodiments of the various figures, it is to be understood that other similar embodiments can be used or modifications and additions can be made to the described embodiments for performing the same functions of secure data storage and retrieval incorporating human participation without deviating therefrom. Therefore, secure data storage and retrieval incorporating human participation as described herein should not be limited to any single embodiment, but rather should be construed in breadth and scope in accordance with the appended claims.

What is claimed:

1. A computer related security method incorporating human participation, the method comprising:
   receiving a request for data stored in a storage medium;
   in response thereto, transmitting from a client agent to a server, a puzzle request and a retrieval tag, wherein the retrieval tag identifies a location of a blob comprising a user secret;
   receiving from the server, a puzzle that requires human participation, and a correct solution to the puzzle;
   transmitting the puzzle from the client agent to a user;
   receiving from the user, a proposed solution to the puzzle;
   transmitting to the user, a query seeking identification of a stored secret;
   receiving from the user, a response to the query seeking identification of the stored secret;
   transmitting to the server, the proposed solution to the puzzle and the response to the query;
   using in the server, the retrieval tag received from the client agent to retrieve the blob for verification of the stored secret; and if the proposed solution to the puzzle and the response to the query is correct, allowing access to the data stored in the storage medium.

2. A method in accordance with claim 1, further comprising:
prior to receiving the proposed solution, requesting a user secret;
receiving the user secret; and
generating the stored secret from the received user secret.

3. A method in accordance with claim 1, wherein:
the puzzle is intended to be visually rendered; and
a solution to the puzzle is intended to be obtained via observation of the visually rendered puzzle.

4. A method in accordance with claim 1, wherein:
the puzzle is intended to be audibly rendered; and
a solution to the puzzle is intended to be obtained via observation of the audio rendered puzzle.

5. A method in accordance with claim 1, further comprising obtaining the puzzle from a library of pluggable puzzle generators.

6. A method in accordance with claim 1, further comprising:
encrypting the data with a first cryptographic key;
encrypting the first cryptographic key with a second cryptographic key;
storing in the storage medium, the encrypted data and the encrypted first cryptographic key; and
if the proposed solution is correct:
decrypting, with the second cryptographic key, the encrypted first cryptographic key; and
providing the decrypted first cryptographic key.

7. A system for implementing computer related security incorporating human participation, the system comprising:
a memory portion configured to store data;
an input/output portion configured to receive a request for accessing the data stored in the memory portion;
a first processing portion of a client agent, the first processing portion configured to:
transmit from the client agent to a server, a puzzle request and a retrieval tag, wherein the retrieval tag identifies a location of a blob comprising a user secret;
receive from the server, a puzzle that requires human participation, and a correct solution to the puzzle;
transmit the puzzle from the client agent to a user;
receive from the user, a proposed solution to the puzzle;
transmit to the user, a query seeking identification of a stored secret;
receive from the user, a response to the query seeking identification of the stored secret; and
transmit to the server, the proposed solution to the puzzle and the response to the query; and
a second processing portion of the server, the second processing portion configured to:
use the retrieval tag received from the client agent, to retrieve the blob for verification of the stored secret;
determine if the proposed solution to the puzzle and the received response to the query is correct; and
if correct, allow access to the data stored in the memory portion.

8. A system in accordance with claim 7, wherein the first processing portion is further configured to:
prior to receiving the proposed solution, request a user secret;
receive the user secret; and
generate the stored secret from the received user secret.

9. A system in accordance with claim 7, wherein:
the puzzle is intended to be visually rendered; and
a solution to the puzzle is intended to be obtained via observation of the visually rendered puzzle.

10. A system in accordance with claim 7, wherein:
the puzzle is intended to be audibly rendered; and
a solution to the puzzle is intended to be obtained via observation of the audio rendered puzzle.

11. A system in accordance with claim 7, the first processing portion further configured to obtain the puzzle from a library of pluggable puzzle generators.

12. A system in accordance with claim 7, wherein:
the second processing portion is further configured to:
encrypt the data with a first cryptographic key;
encrypt the first cryptographic key with a second cryptographic key;
store in the memory portion, the encrypted data and the encrypted first cryptographic key; and
if the proposed solution is correct, decrypt, with the second cryptographic key, the encrypted first cryptographic key; and
the input/output portion is further configured to provide the decrypted first cryptographic key.

13. A computer-readable storage medium having stored thereon computer-executable instructions for performing computer related security incorporating human participation, by performing the steps of:
receiving from a client agent, a puzzle request and a retrieval tag that identifies a location of a blob comprising a user secret;
responsive to the request, obtaining a puzzle from a library of pluggable puzzle generators;
transmitting to the client agent, the puzzle, wherein human participation is intended to obtain a solution to the puzzle;
receiving a user-provided proposed solution to the puzzle;
receiving a user-provided response to a query seeking identification of the user secret;
using the retrieval tag received from the client agent, to retrieve the blob for verification of the user secret; and
if the proposed solution to the puzzle and the response to the query is correct, allowing user access to a stored data.

14. A computer-readable storage medium in accordance with claim 13, wherein:
the puzzle is intended to be visually rendered; and
a solution to the puzzle is intended to be obtained via observation of the visually rendered puzzle.

15. A computer-readable storage medium in accordance with claim 13, wherein:
the puzzle is intended to be audibly rendered; and
a solution to the puzzle is intended to be obtained via observation of the audio rendered puzzle.

* * * * *